United States Patent [19]

Paisley et al.

[11] 4,363,849

[45] Dec. 14, 1982

[54] FOAMED THERMOPLASTIC RESIN CORK HAVING A NATURAL CORK-LIKE APPEARANCE AND A METHOD OF INJECTION MOLDING THE CORK

[75] Inventors: Gary V. Paisley, Atlanta, Ga.; J. George Altschuler, Montreal, Canada; Josef Rommler, Ulm, Fed. Rep. of Germany

[73] Assignee: The Coca-Cola Company, Atlanta, Ga.

[21] Appl. No.: 202,156

[22] Filed: Oct. 30, 1980

[51] Int. Cl.³ .................... B29D 27/00; B29F 1/04
[52] U.S. Cl. .................... 428/318.8; 215/355; 215/362; 264/45.5; 264/54; 264/328.12; 264/DIG. 14; 264/DIG. 83; 521/51; 521/144
[58] Field of Search ......... 264/45.5, DIG. 83, 328.12, 264/54, DIG. 14; 521/51, 144; 428/318.8; 215/355, 362

[56] References Cited

U.S. PATENT DOCUMENTS

| | | |
|---|---|---|
| 2,387,730 | 10/1945 | Alderson et al. |
| 2,912,719 | 11/1959 | Gilmore et al. ............ 264/DIG. 83 |
| 3,121,130 | 2/1964 | Wiley et al. |
| 3,218,375 | 11/1965 | Hardwick |
| 3,231,938 | 2/1966 | Seymour ................. 264/328.9 X |
| 3,241,191 | 3/1966 | Novel ...................... 264/328.9 X |
| 3,268,636 | 8/1966 | Angell, Jr. |
| 3,306,960 | 2/1967 | Weissman et al. |
| 3,384,691 | 5/1968 | Weissman et al. |
| 3,436,446 | 4/1969 | Angell, Jr. |
| 3,468,990 | 9/1969 | Odell |
| 3,720,572 | 3/1973 | Soda et al. |
| 3,780,764 | 12/1973 | Geist ..................... 425/564 X |
| 3,867,493 | 2/1975 | Seki |
| 3,941,529 | 3/1976 | Klingebiel |
| 3,950,484 | 4/1976 | Egli |
| 3,984,022 | 10/1976 | Babiol |
| 3,988,403 | 10/1976 | Angell et al. ............. 264/DIG. 83 |
| 3,993,721 | 11/1976 | Soda et al. |
| 4,042,543 | 8/1977 | Strickman et al. |
| 4,091,136 | 5/1978 | O'Brien et al. ............ 264/45.5 X |
| 4,129,635 | 12/1978 | Yasuike et al. |
| 4,188,457 | 2/1980 | Throp .................... 521/51 X |
| 4,192,839 | 3/1980 | Hayashi et al. |
| 4,212,626 | 7/1980 | Gellert ................... 264/328.9 X |
| 4,255,368 | 3/1981 | Olabisi |

FOREIGN PATENT DOCUMENTS

| | | |
|---|---|---|
| 2500534 | 7/1976 | Fed. Rep. of Germany ..... 264/45.5 |
| 2503230 | 7/1976 | Fed. Rep. of Germany ... 264/DIG. 83 |
| 1508722 | 1/1967 | France. |
| 2254486 | 7/1975 | France. |
| 2349508 | 11/1977 | France. |
| 2284534 | 6/1978 | France. |
| 2330603 | 5/1979 | France. |
| 46-14138 | 4/1971 | Japan ..................... 264/328.13 |

OTHER PUBLICATIONS

"The Condensed Chemical Dictionary", Tenth Edition, Revised by Gessner G. Hawley, New York, Van Nostrand Reinhold, ©1981, p. 767.
Naugatuck Chemical Bulletin, "The Technology of Celogen Blowing Agents: Celogen OT: p,p'-oxybis(-benzene sulfonyl hydrazide)", Naugatuck, Conn., U.S. Rubber Co., Naugatuck Chemical Div., Nov. 10, 1975, One page.
Ballman; R. L.; R. L. Kruse and W. P. Taggart, "Surface Fracture in Injection Molding of Filled Polymers", In *Polymer Engineering and Science*, May 1970, vol. 10, No. 3, pp. 154–158.
Chemical Abstracts, vol. 40, 500⁸; "Cork–Products From Polymers of Ethylene", Alderson, Jr.
*Good Packaging*, Nov., 1979; "Cellukork May Have a Significant Impact on Wine Industry".

*Primary Examiner*—Philip E. Anderson
*Attorney, Agent, or Firm*—Birch, Stewart, Kolasch & Birch

[57] ABSTRACT

A method for making closures resembling natural cork for sealing liquid product containers is described. A strand of expandable plastic material is injected into each mold cavity and is permitted to collect in that cavity in randomly oriented groups of coils which expand to fill the cavity and coalesce to create randomly oriented grain lines on the surface of the closure resembling the appearance of natural cork. Also described are methods of molding the closures which preclude the formation of leakage channels on the closure surface and preferred blends of plastic resins and pigment particles used to achieve the cork-like appearance.

24 Claims, 9 Drawing Figures

FOAMED THERMOPLASTIC RESIN CORK HAVING A NATURAL CORK-LIKE APPEARANCE AND A METHOD OF INJECTION MOLDING THE CORK

BACKGROUND OF THE INVENTION

1. Field of the Invention

The present invention relates to closures for liquid product containers and, methods and apparatus for making the same. More specifically, the present invention relates to molded synthetic plastic closures which resemble the appearance of natural cork and molding techniques for making the same.

2. Description of Prior Art

It is known heretofore to manufacture articles from foamed thermoplastic materials by injection or extrusion of polyurethane, polystyrene or polyolefins. In these cases, the thermoplastic material may be expanded from a granular form to assume a porous, solidified foam-like structure by the action of various propellants or agents for expanding or blowing the materials. The blowing agents, in accordance with normal practice, are usually gases or gas generating substances that have been dissolved or otherwise intimately incorporated within the thermoplastic resinous material while it is in an unexpanded granular form. The application of heat to such a mixture causes the blowing agent to be released or thermally expanded or both, while the thermoplastic material is attaining a foaming temperature at which it is sufficiently softened and yieldable to permit the pressure of the expanding blowing agent to expand it into the desired foam structure.

In a special case of extrusion forming of foamed thermoplastic materials, it is also known to decorate the surface of articles so produced to resemble natural wood by imparting to the surface a parallel grain structure. Such decoration is accomplished by extruding the material through a die having, in particular, a multiple number of apertures to form a corresponding number of strands of expanding resin, collecting these strands in parallel relationship, and then coalescing them into a body of any desired length. Contacting surfaces of the strands create parallel grain lines which remain clearly visible in the surface of the finished articles and resemble natural wood grain.

In a special case of injection molding of foam thermoplastics, it is known to mold articles by injecting into an enclosed cavity a measured amount of expandable thermoplastic resin so that the cavity is not completely filled by the unexpanded material but becomes filled as the material expands. As expansion occurs, the softened resin is forced by a gaseous blowing agent into contact with the relatively cool walls of the mold cavity where the portion of the resin in direct contact with the walls is solidified and forms a dense outer layer or skin conforming to the shape of the cavity and functioning as a barrier, thereby preventing the escape of the gaseous blowing agent from the article and causing gas bubbles to be entrapped in the article's interior region. Thus, articles molded in this manner are characterized by a porous, foam-like interior and a dense outer shell or skin having the same general size and shape as the mold cavity and which are essentially impermeable to most substances.

By employing certain highly flexible thermoplastic materials, for example polyolefin copolymers, such as ethylene vinyl acetate, in the previously described injection molding process, the resulting foamed articles will exhibit elastic properties closely resembling similar products manufactured from other natural and synthetic elastomers. This flexibility and resiliency plus the presence of an essentially impermeable skin allows these same articles if molded into the proper size and shape, to function as closures for liquid product containers by being compressed and fitted into the container opening, then being allowed to expand, filling the opening and creating a continuous seal about its perimeter.

Therefore, such articles would theoretically be useful as replacements for similar closure devices manufactured of more familiar materials, such as natural cork used in containers of medicine, wine and spirits. In reality, efforts at replacing natural cork closures in liquid product containers, especially containers for wine products, by manufacturing and utilizing closures from injection molded foamed thermoplastics have not been very successful. This has been due primarily, it is believed, to the lack of aesthetically created consumer appeal for such closures, and the relationship of the dense outer skin to the porous inner core which dense outer skin, while necessary to make the closure essentially impermeable, can be a detriment to the sealing function of these articles, particularly when leakage channels are formed on the dense outer skin during the sealing of these articles.

Since such prior art closures must be compressed to be fitted into liquid product containers there is a tendency for the dense outer layer of the closures to wrinkle and form longitudinal channels in the outer surface of the foamed articles. Such channels could form leakage paths for the container contents or allow the ingress of substances harmful to the product being contained, such as ambient air in the case of the medicine or food products. Tests have shown that these channels are caused primarily by the presence of relatively large void spaces between the dense outer skins and the porous inner core of the foamed articles, their presence being the result of a previously unrecognized phenomena occuring during the molding of the articles. Since the dense outer skin has a much higher resistance to compression than the porous inner core, it tends to deflect into any available void space, creating a channel on the outer surface of the closure that could result in a disruption of the otherwise continuous perimeter seal.

In addition to the foregoing problems, prior art molded closures have not been uniform and consistent in design and performance. Thus, such prior art closures have not been found readily acceptable as a replacement for similar closure devices, such as natural cork used in containers of medicine, wine and spirits. It is well known that natural cork contains various holes and crooks and many times will crumble and break when inserted or withdrawn from the product container.

SUMMARY OF THE INVENTION

Accordingly, it is a primary object of the present invention to provide a molded liquid product container closure having a foamed plastic interior and a liquid impervious plastic outer skin which is not subject to any appreciable wrinkling when compressed.

It is a further object of the present invention to incorporate into the molding technique a method of decorating the outer skin of the closure so that it resembles the appearance of natural cork.

It is another object of the present invention to provide a synthetic cork article and a means of making same which approaches many of the physical properties of natural cork when employed as a closure for a liquid product container.

It is another object of the present invention to provide a synthetic cork article and a means of making same that may be employed as a wine bottle stopper and is removable using an ordinary corkscrew.

It is another object of the present invention to provide a synthetic cork article and a means of making same which may be used as a cork substitute in existing bottling equipment without malfunction of said equipment.

It is another object of the present invention to provide a synthetic cork article that can be manufactured with uniformity and will not break or crumble when inserted or withdrawn from the product container.

Thus, the combined objectives of the present invention are to provide a synthetic cork article and a means of making same which will perform satisfactorily as a substitute for natural cork in a closure, or portion of a closure, for a liquid product container without fear of leakage into or out of said container and will satisfy the aesthetic requirement for a natural cork closure in such containers as those for wine and liquor products.

The objects of the present invention are fulfilled by injecting the thermoplastic resin into each mold cavity through a single orifice in each mold cavity which forms the material into a single and continuous elongated strand within each mold cavity. As the strand length builds in each mold cavity, it is contained by the cavity walls which force the single and continuous elongated strand to collect in a random fashion when the strand meets resistance within the mold cavity and contact itself at various points along its length. The expansion of the blowing agent causes the randomly positioned loops of the strand to expand and coalesce leaving grain lines in the surface of the molded article similar to those found in the surface of extruded articles manufactured in accordance with previously known teachings but which, in distinction, are not straight or parallel but of varying direction, occasionally intersecting, and which are formed from a single and continuous elongated strand of resin. Also, these articles contain the randomly oriented grain lines on the entire outer surface, including the ends thereof, and thus constitutes an improvement over articles manufactured by extrusion that normally do not contain randomly oriented grain lines on the ends of the articles. These randomly oriented grain lines, when embodied in the entire surface of an article having the same general size and shape as the natural cork portion of a closure for a liquid product container, cause the article to resemble natural cork in appearance.

Resistance to wrinkling during subsequent compression of the article is improved to a satisfactory level by incorporating into the molding method of the present invention a specific technique and series of embodiments to the molding equipment which, together, eliminate the tendency of the foaming material to form large void spaces between the dense outer skin and the foamed interior of the article. This is accomplished by insuring that all the resin material to be utilized in each article enters the mold cavity, and that each cavity entrance is positively sealed prior to the expansion of the resin, to form a solidified outer skin adjacent to the cavity wall.

It was found in prior molding techniques that further ingress of material after the relatively rigid and dense outer skin has formed, sets up a shear boundary layer within the material being molded and results in the still soft inner core of the article shifting relative to the dense outer skin, thus breaking the material bond between the dense outer skin and the inner core. Gas pressure subsequently forces the porous inner core of the article away from the dense outer skin thereby creating large void spaces immediately beneath the rigid and dense outer skin. The lack of a complete bond between the dense outer skin and the porous inner core results in, during compression of the molded article, relative movement between the two components (i.e. dense outer skin and porous inner core) of the molded closure device, which results in wrinkles and leakage paths on the outer surface of the molded closure device.

Chronological separation of injection and expansion steps is achieved by several embodiments to the improved molding technique and equipment of the present invention including:

1. The maximization of the available injection pressure and speed with a corresponding minimization of venting within each mold cavity of a plurality of mold cavities with the result, during injection, of a temporary pressurization of each cavity caused by rapid ingress of expandable resin and the opposing slow escape of displaced gas which restricts the expansion of the thermoplastic resin to form a solidified exterior until the injection of each cavity is completed.
2. The creation of a runnerless molding technique by the incorporation within the single small orifice of each mold cavity through which all material must flow to reach each mold cavity of a positive means of shutting off the flow of material to or from each cavity such that no continued channel for resin flow exists between each shutoff in its associated cavity and the heated runner channel following completion of the injection portion of the molding cycle of that particular cavity.
3. The utilization of each shutoff in its associated cavity as a means of initiating and terminating the injection of material into each cavity such that the period for transfer of material to or from each mold cavity through its respective injection orifice can be positively controlled.

BRIEF DESCRIPTION OF THE DRAWINGS

The objects of the present invention and the attendant advantages thereof will become more readily apparent by reference to the following drawings wherein like reference characters are employed to designate like parts.

DETAILED DESCRIPTION OF THE DRAWINGS

Figure 1:
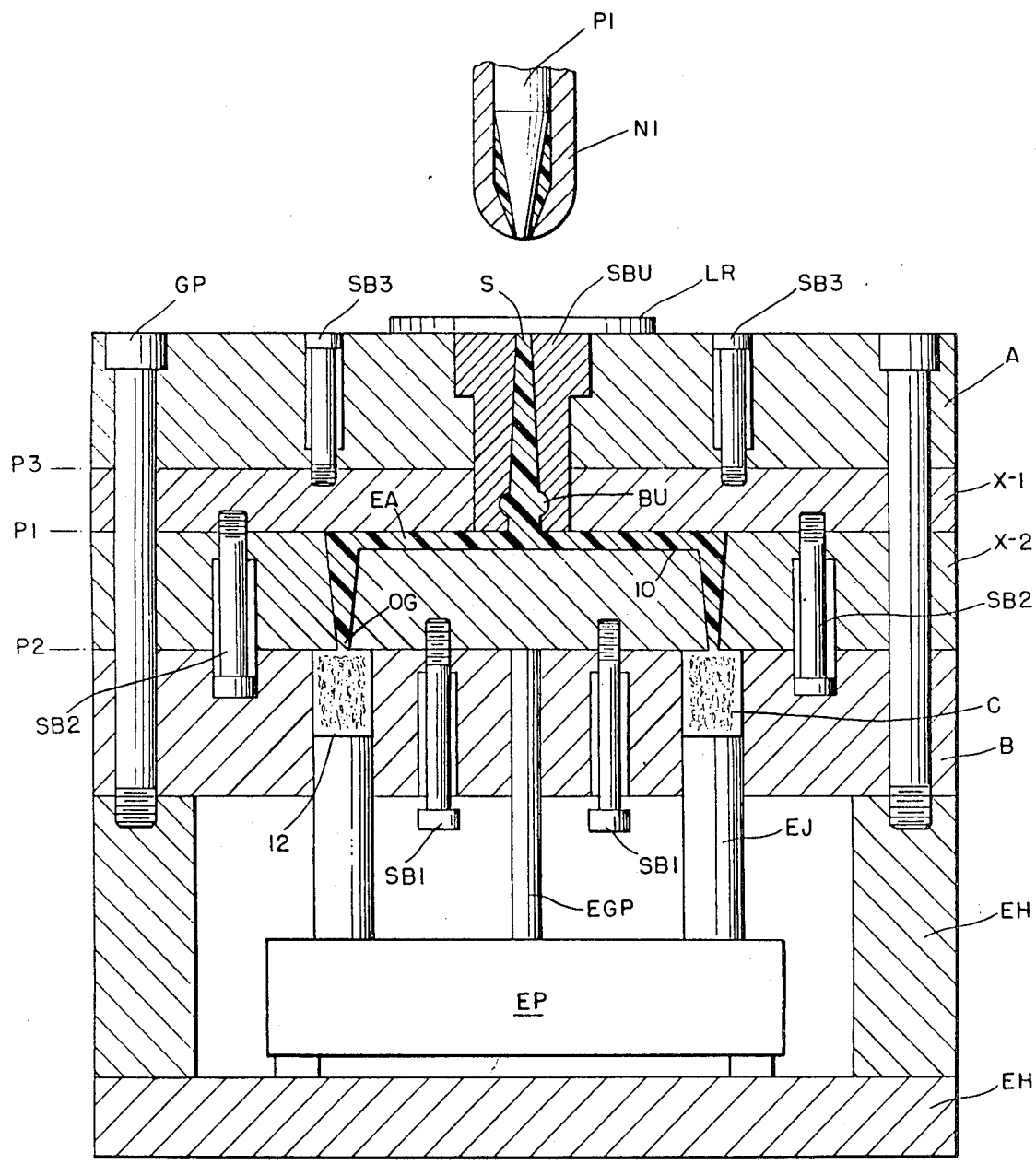
FIG. 1 is a cross-sectional view of a typical mold which could be used in an attempt to manufacture closures for liquid product containers which resemble natural cork.

To provide a synthetic cork closure device which can function satisfactorily as a replacement for the natural cork portion of closures for containers of medicine and food products such as wine and spirits, it has been found necessary to control the size, shape, surface smoothness, elasticity, density distribution and aesthetic appearance of such articles. Factors found to be of particular importance in achieving the desired results in these areas include the use of particular kinds of thermoplastic resin and blends thereof, blowing agents, processing temperatures, injection pressures and injection speed, mold design and mold temperatures.

The basic resinous materials utilized in the invention is preferably a polyolefin having good flexibility and resiliency such as ethylene vinylacetate copolymer (EVA). To achieve the exact combination of properties desired in the finished articles, it is necessary to choose an EVA material based on the percentage of vinylacetate (%VA) incorporated into the copolymer and the melt index of the resin. Typically usable resin grades vary between 9 and 25% by weight VA and between 2.0 and 8.0 in melt index and are available from a number of sources. The properties of the finished closures may be enhanced by the addition to the basic resin of small quantities of a hardness modifying additive, such as polyethylene or ionically cross-linked ethylene methacrylic acid copolymers. The addition of such hardness modifying additives, such as polyethylene or ionically cross-linked ethylene methacrylic acid copolymers, tends to vary the hardness and strength of the finished article.

To the basic resin or mixture of resins is added a suitable chemical blowing agent to expand the resin to proper density. The preferred blowing agent is azodicarbonamide (ABFA) because of its decomposition temperature which is in the normal processing range of EVA resin and because of its relatively high rate of gas evolution. Of course, other known blowing agents, such as "Celogen OT" called an ozodecarboxide blowing agent by O'Brien et al. U.S. Pat. No. (4,091,136) may be utilized without departing from the spirit and scope of the present invention.

The amount of blowing agent to be added is dependent on the density distribution desired in the finished article and the processing temperature of the raw material. For example, it has been found that by minimizing the proportion of blowing agent level and/or the processing temperature, articles are produced that exhibit a less dense outer skin and a less porous inner core, thereby making the density distribution through the article more uniform, which of course, is more desirable to prevent leakage paths on the exterior surface of the molded articles.

In addition to the resins and chemical blowing agent, pigments are added to the raw material blend to give a cork-like color to the molded article. Optionally, a number of other materials also may be added including surface lubricants, chemical blowing agent activators and ultra-violet radiation stabilizers, all of which may add slight improvements to the producibility and/or performance of the articles.

In producing synthetic cork closures, appropriate amounts of each of the materials are mixed thoroughly prior to molding. A typically preferred blend is as follows:

| | |
|---|---|
| EVA, 9–25% VA and melt index 2.0–8.0 | 80% by wt. |
| Polyethylene homopolymer | 19% |
| ABFA | 0.5% |
| Pigment blend | 0.5% |
| | 100.0% by wt. |

Figure 3:
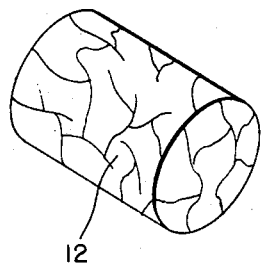
FIG. 3 is a perspective view of one embodiment of a closure for a liquid product container in accordance with the present invention.
Figure 4:
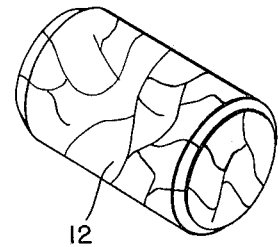
FIG. 4 is a perspective view of another embodiment of the closure of the present invention.
Figure 5:
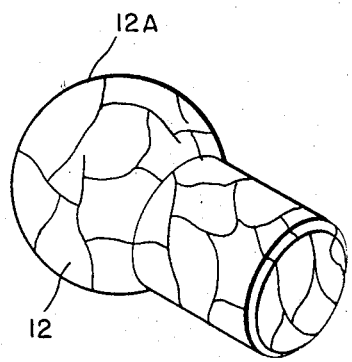
FIG. 5 is a perspective view of still another embodiment of a closure for a liquid product container in accordance with the present invention.
Figure 6:
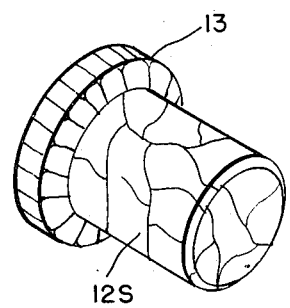
FIG. 6 is a perspective view of a closure for a liquid product container which incorporates the present invention as only a portion of the closure.

With this blend, 24 mm diameter by 1.75 inch long closures 12 of the type often utilized in standard 750 mL wine bottles, and as shown in FIG. 3 and 4, were manufactured at processing temperatures in the range of 370°–400° F. This particular closure size and resultant density distribution showed superior mechanical performance characteristics to similar natural cork closures or to other synthetic cork closures of a different density distribution. Other closure styles can be manufactured using this blend of materials and have shown comparable results. These include a closure 12 having an enlarged end 12A for gripping as shown in FIG. 5, and the shank portion 12S of a 2-piece closure as shown in FIG. 6, which is subsequently attached or glued to a metal, plastic or wooden cap 13 with adhesive.

To minimize the cooling time of the molded article, the optimum mold temperature was found to be 70°–90° F. After molding, the closures are ejected from each mold cavity into water or refrigerated environment for cooling purposes.

In order to achieve an authentic cork-like color and appearance, it is a discovery of the present invention that the use of coarse ground powdered pigments as a portion of the pigment blend enhances the cork-like appearance of the finished articles by leaving specks in or near the surface of the closure. These specks improve the likeness to cork which also contains such "blemishes". In a preferred embodiment, a pigment blend was utilized, wherein at least 5% of the pigment blend contained a FD&C certified alumina-lake powder having a particle size in the range of 40–60 microns. Such a pigment blend produced a closure having a cork-like color and appearance.

Figure 2:
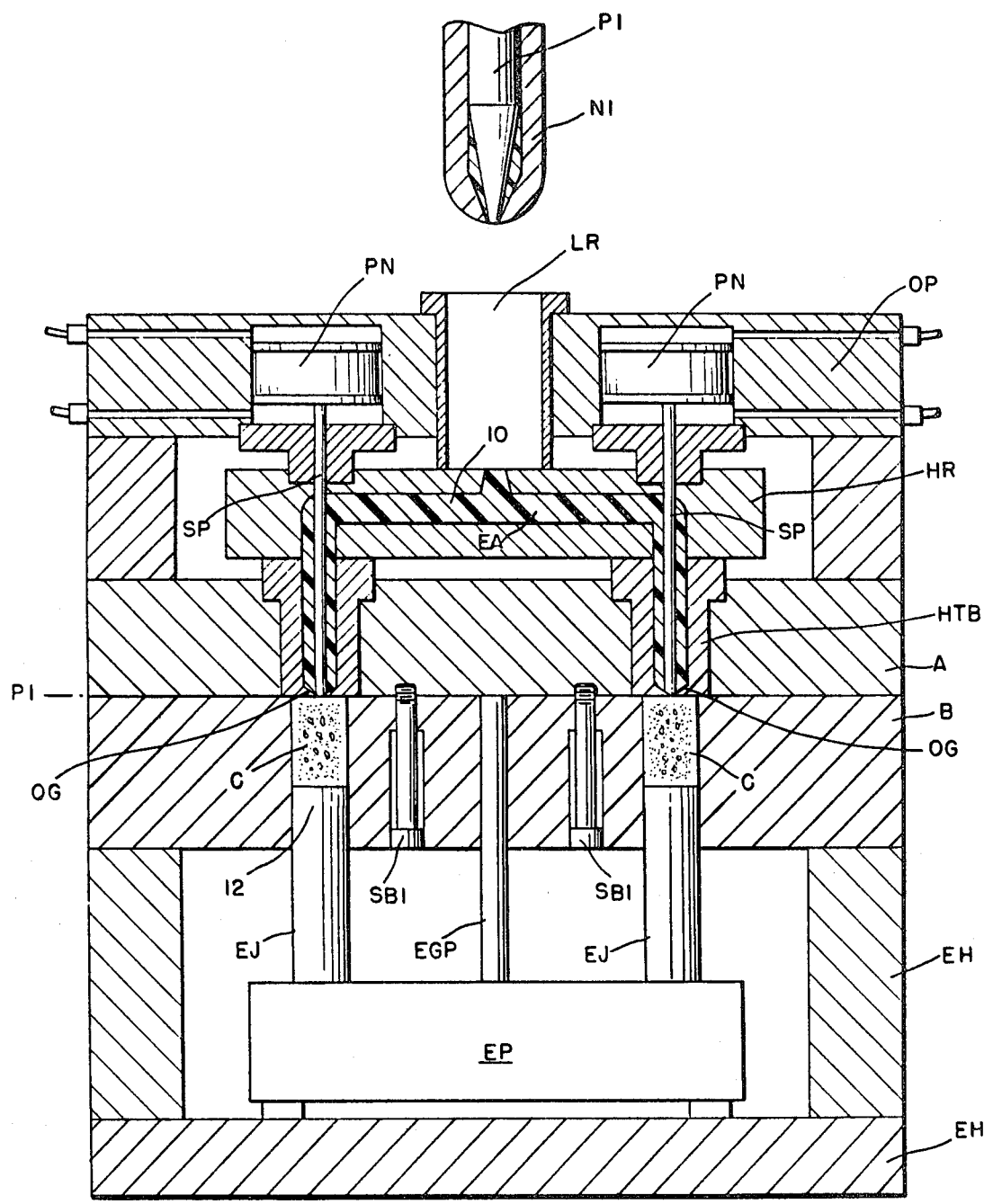
FIG. 2 is a cross-sectional view of the mold of the preferred embodiment of the present invention for the manufacture of closures for liquid product containers which resemble natural cork, but do not have undesirable channels on the exterior surface of the molded article and not subject to appreciable wrinkling.
Figure 9:
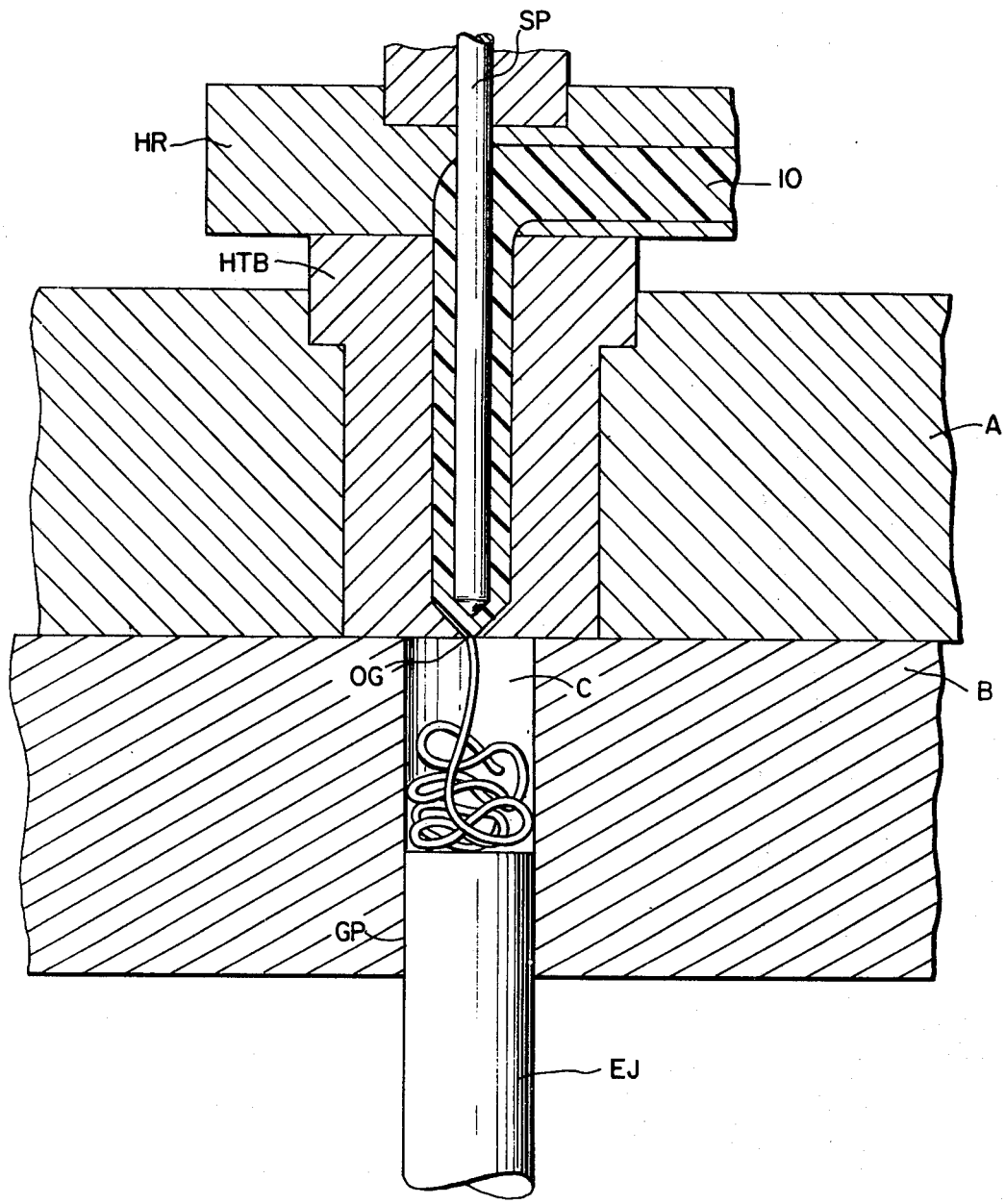
FIG. 9 is an enlargement of a portion of FIG. 2 showing the introduction of a single strand of thermoplastic resinous material into the mold cavity.

To produce articles which would perform adequately as closures and which incorporate the decorative surface resembling natural cork, it is necessary to design a special mold which causes the melted resin material to be injected into each mold cavity in the form of a single long continuous strand. This is done by fitting each mold of a plurality of mold cavities with a single aperture or gate of extremely small size through which all resin entering the cavity must pass. FIG. 9, which is an enlargement of a portion of FIG. 2, shows a shutoff pin SP in the retracted position and a single strand of unexpanded resinous material being introduced into the mold cavity. The surface decoration was found to be alterable by changing the size of the orifice. However, articles molded using an orifice diameter between 0.030 and 0.055 inch was most preferred from an aesthetic standpoint. Pressure on the melted resin material from the injection unit forces the melted resin material to be injected into each cavity through its respective orifice, thereby depositing a single strand of softened resin in the cavity. The cavity walls of each enclosure, in turn, produce resistance to the strand and force the strand to collect in a randomly oriented group of coils which expand to fill the cavity. The coalesence of the loops during expansion creates randomly oriented grain lines which remain clearly visible in the article's surface following solidification. The presence of the randomly oriented grain lines, results in a molded article that closely resembles natural cork. These randomly oriented grain lines may be accentuated by using a pigment blend that contains at least 5% of a FD&C certified alumina-lake powder having a particle size in the range of 40–60 microns.

One type of mold which can be utilized is depicted in FIG. 1. Because the molded article's ability to seal the container is improved by its smoothness on the surface which contacts the container, it is desirable that this surface contain no parting lines or gating blemishes. Therefore, the mold should be designed so that the parting line is along the edge of the contact surface and gating is accomplished on a surface which will not contact the container, when the closure is used in sealing the container, namely, an end of the closure being formed. In the mold of FIG. 1, utilizing a permanent channel for plastic flow to the mold cavity, referred to as a sprue S and runner EA, a mold having at least four plates which separate during the ejection sequence was required. Plate A contains the sprue bushing SBU which has a means of pulling the solidified material 10 remaining in the sprue S and runner EA away from the molded article during ejection. Plate X-1 is designed to strip the solidified material from the sprue bushing SBU. Plate X-2 forms the top surface of the cavities and contains the runner EA and the orifice gates OG required for injection of material into the cavities C. Plate B contains the cavities C, themselves.

Although four plates including Plate A are illustrated in FIG. 1, the three plates X-1, X-2, and B constitute a conventional type of 3-plate injection mold. In use, the Plate A is bolted to the fixed platen (not shown) of the molding machine using the locating ring LR for alignment with a corresponding hole on the platen. The ejector housing EH is then bolted to the moving platen (not shown). The mold is then operated simply by travel of the moving platen which opens and closes the mold as follows: From the full shut position, which is shown, the moving platen starts pulling the mold apart, the plates sliding on four guide pins GP. The mold may part originally at either parting line P1 or P2. Assuming parting line P1, the ejector housing EH and Plate B which are bolted together plus the plate X-2, will travel away with the moving platen until the stripper bolts SB2 take up. This action breaks the connection between the molded part 12 and the solidified material in the sprue S and runner 10 at the gate opening OG. At take up, the distance between the X-1 and X-2 plates is held and, as the platen continues to travel, the mold parts at parting line P2. Plate B will continue to separate from plate X-2 until stripper bolts SB1 take up. During this travel, the ejector plate EP makes contact with a fixed stop, forcing the ejector pin EJ to remain still while the Plate B continues to travel. This forces the molded parts 12 to be automatically ejected from their respective cavity.

After stripper bolts SB1 and SB2 have taken up, plate X-1 is pulled away from Plate A. The Plate X-1 was originally held in position by the solidified material in the sprue and runner channel which forms the shape of the sprue channel 5 having a bulge BU and a runner EA. The bulge holds the solidified material 10 in the sprue bushing SBU when the plate X-2 starts away, allowing the sprue and runner to break at the gate OG. When the plate X-1 starts to travel it acts on the solidified material to pull it from the sprue channel. The plate X-1 is slotted (not shown) so that after the solidified material is pulled from the channel it drops through the slot and out of the mold. The mold is reclosed by reversing the moving platen.

In operation, the injection nozzle valve N1 is brought into contact with the sprue bushing SBU. It is then opened by retracting pin P1 and softened resin is injected into the sprue channel defined by sprue bushing SBU where it initially starts to expand. Continued injection, however, fills and pressurizes the sprue channel, compressing the resin back towards its original state. At a certain pressure, the resin will begin to be injected through the small orifice gates OG leading to the mold cavities C where it again starts to expand. At the appropriate time, before each cavity C becomes completely filled, the nozzle valve N1 is shut off, stopping the flow of material to the sprue channel. Material will continue to flow, however, from the sprue chamber to the mold cavity at a decreasing rate as the two different pressures attempt to equalize. At some point, depending on the initial temperature and viscosity characteristics of the resin, the mold temperature and the size of the orifice OG, the material within the orifice itself will stop moving and solidify, preventing further transfer to or from the cavities C. Simultaneously with this injection sequence, the material entering the cavities C will undergo expansion, the rate of expansion being a function of the material blend, the material temperature, the design of the mold with regard to venting in the cavities C and the total amount of material injected. It has been found that subtle changes in resin blend or temperature will cause significant differences in the amount of resin which actually enters the cavity. Therefore, a well-balanced runner system is a necessity in the mold machine.

Figure 7:
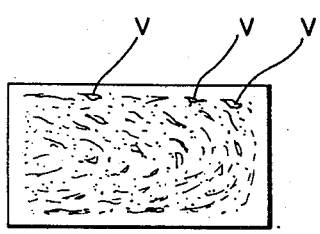
FIG. 7 is a cross-sectional view of a closure for a liquid product container formed from the mold of FIG. 1.

The rapid injection of material into the mold is of importance to the subsequent performance of the molded article as a closure for a liquid product container. If injection occurs too slowly, the initial portion of the resin entering the cavity will have time to expand, contact the relatively cool walls of the mold cavity and solidify into a rigid and dense outer skin before the remainder of the resin can enter the cavity. Continued injection after this dense outer skin has formed will set up a shear boundary layer within the article being molded between the still soft inner core and the rigid outer skin which results in a shift between the two portions. This shift breaks the material bond between the two distinct portions of the molded closure. Expanding gas will ultimately collect in the boundary layer surface and force the two segments of the closure apart, thereby creating large voids V immediately beneath the dense outer skin of the closure as illustrated in FIG. 7.

During subsequent compression of the molded closures 12 for use in liquid product containers, these voids would serve as spaces into which the dense outer skin of the article could deflect to avoid compression, thereby creating a longitudinal channel on the molded closure surface. These longitudinal channels often become leakage paths between the molded closure and the container wall allowing substances into or out of the container. To avoid these leaks, it is necessary to eliminate the presence of the void spaces by completing the injection of resin material into the mold cavity prior to its expansion to form a rigid and dense outer skin.

It should be understood that the mold of FIG. 1 can be successfully utilized to achieve one object of the present invention, namely, a synthetic cork having an external appearance resembling natural cork. However, the mold of FIG. 2 and the method of utilizing the same described hereinafter, eliminates the creation of the aforementioned void spaces.

The mold of FIG. 2 works similarly to that of FIG. 1, except that there are far fewer parts since no solidified material must be ejected from the sprue and runner chamber. A hot runner system is utilized instead. The hot runner manifold HR and the hot tip bushings HTB, contain heaters (not shown) which prevent the plastic resin in the runner system EA from solidifying. A lone parting line P1 exists between plates A and B since the X-1 and X-2 plates no longer exist.

To accomplish this task of eliminating void spaces, it is desirable to increase the injection pressure to the maximum available on the molding machine (at the time of the test, approximately 16,000 psig), and (because injection pressure is created in this case by a hydraulic fluid cylinder/), to enlarge the flow channel of pressurized hydraulic fluid to the cylinder so that a very high pressure can be maintained on the resin at all times during injection. Next, mold cavity venting should be decreased to minimum by reducing the clearances between the mold parts such as plates A and B which form the cavities C. This results in the cavities being temporarily pressurized by the entrance of the resin and subsequent displacement of the air so that the pressure, which served to restrict the expansion of the resin, is retained longer.

However, when a mold is utilized such as the mold of FIG. 1, even with extremely rapid injection times and minimum venting, some shear boundary layer damage may still occur to the interior of the molded articles 12 due to the continued slow ingress of pressurized material from the sprue chamber to the cavity C after actual injection has ceased. It is a discovery of the present invention that to control the transfer of material more directly, it is necessary to incorporate a valve within the orifice gate OG itself. This led to the invention of the preferred mold and valve configuration depicted in FIG. 2.

The valve pins SP of FIG. 2 are specially designed to fit into orifice gates OG of the mold and to perform the intended function of allowing sprueless molding.

The pins SP slide back and forth in the runner system EA, opening and closing the orifice gates. The pins SP can be powered hydraulically or pneumatically, using a piston arrangement PN as shown in FIG. 2. Of additional importance is the fact that the sealing is accomplished at the very tip of the orifice gate OG to prevent any premature expansion of resin.

With this FIG. 2 mold, a cycle is also initiated as in FIG. 1 by bringing the nozzle into contact with the hot runner manifold HR, opening the valves P1 and SP and injecting a measured amount of resin into each cavity. Again, before each cavity is completely filled, the valves are shutoff, allowing the material already in each cavity C to expand. However, because the shutoff pins in FIG. 2 are directly adjacent to the mold cavities at openings OG, no volume of softened, pressurized material remains in direct contact with the material being molded during the cooling and solidification period of the molded articles 12 which could cause the continued slow ingress of material into the cavities C. By the continued utilization of high injection pressure and minimum mold venting, it is possible, in this FIG. 2 design to complete and terminate the injection of material into each mold cavity proper prior to its expansion to form a skin. Thus, the creation of the undesirable void spaces is eliminated.

Figure 8:
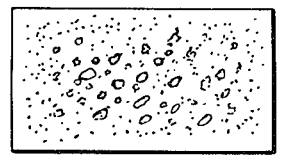
FIG. 8 is a cross-sectional view of a closure for a liquid product container of the improved type in accordance with the present invention made from the mold of FIG. 2.

The remainder of the molding cycle is similar to other conventional injection molding operations, as described in the operation of the mold of FIG. 1. After a sufficient cooling period, the mold is opened and the solidified closure 12 is automatically ejected into water or similar refrigerated environment. Reclosing the mold initiates a repeat of the cycle. Closures molded by this method of FIG. 2, as shown in FIG. 8, have been found to exhibit none of the boundary layer-created voids of previous methods. Subsequent usage in liquid product containers has shown that leakage due to channels in the closure surface has ceased to be a problem. Furthermore, in the present molding method, no material is wasted by solidification in the sprue and runner chamber, thereby reducing molding costs.

The invention being thus described, it will be obvious that the same may be varied in many ways. Such variations are not to be regarded as a departure from the spirit and scope of the present invention and all such modifications as would be obvious to one skilled in the art are intended to be included within the scope of the following claims.

We claim:

1. A method for making a closure made of a thermoplastic resinous material and having a natural cork-like appearance which comprises,
   providing a mold cavity with an entrance orifice, said mold cavity having the shape of said closure with predetermined internal dimensions, the wall of said mold cavity opposite the entrance orifice being sufficiently spaced from said entrance orifice to permit the formation of a strand of thermoplastic resinous material therein,
   rapidly injection, at high pressure an expandable thermoplastic resinous material in an amount less than that required to fill the mold cavity and in the form of a strand, into said mold cavity, said strand collecting in said cavity as randomly-oriented coils, the pressure produced in said mold cavity by said injection temporarily pressurizing said cavity, thereby retarding the expansion of the thermoplastic resinous material sufficiently to allow completion of the injection of said thermoplastic resinous material, while maintaining the integrity of the strand configuration,
   simultaneously with said temporary pressurization, gradually removing a portion of the air displaced by said injected thermoplastic resinous material through controlled minimum venting of said mold cavity, thereby expanding the coiled resinous material in a controlled manner through a continuation of said minimum venting to fill said mold cavity, the walls of said mold cavity being maintained at a temperature sufficiently cool to cause the resinous material to solidify into a rigid, outer skin when it contacts said walls, whereby the coalesence of said coils during expansion creates randomly-oriented grain lines in the surface of said closure which resembles the appearance of natural cork.

2. The method for making the thermoplastic resinous closure for liquid product containers according to claim 1 wherein said mold cavity is disposed in a sprueless mold and has walls defining the shape of said closure and an entrance orifice is provided in one of said walls and said strand contains a predetermined amount of expandable thermoplastic resinous material to be injected directly into said mold cavity through said entrance orifice, and comprising the further step of:

sealing said entrance orifice immediately after said amount of thermoplastic resinous material has been injected into said cavity to stop any further flow of resinous material into said cavity and keeping said entrance orifice sealed until said resinous material expands within the mold cavity to form said closure, whereby the closure thus formed has a liquid impervious outer skin and a foamed core with no appreciable void spaces or separations between said outer skin and said foamed core into which said outer skin could collapse when compressed.

3. The method of claims 1 or 2 wherein said thermoplastic resinous material comprises a blend of:

ethylene-vinyl acetate copolymer having a melt index of about 2.0 to 8.0 and containing vinyl acetate in an amount of about 9 to 25% by weight;
a blowing agent; and a pigment for imparting the color of natural cork to said blend.

4. The method of claim 3, wherein the thermoplastic resinous material further includes polyethylene.

5. The method of claim 4 wherein the ethylene-vinyl acetate copolymer is present in an amount of about 80% by weight and contains about 19% polyethylene by weight, the blowing agent is present in an amount of about 0.5% by weight and the pigment is present in an amount of about 0.5% by weight.

6. The method of claim 3 wherein said blowing agent is azodicarbonamide.

7. The method of claim 3, the thermoplastic resinous material further including an ionically cross-linked ethylene methacrylic acid copolymer.

8. The method of claims 1 or 2 wherein said thermoplastic resinous material is mixed with a pigment blend, at least 5% of which is a powdered pigment having a particle size in the range of 40-60 microns.

9. The method of claim 3 wherein said pigment blend includes at least 5% of a powdered pigment having a particle size in the range of 40-60 microns.

10. The method of claim 1 wherein the mold cavity is positively sealed immediately after the introduction of said quantity of thermoplastic resinous material into the mold cavity.

11. The method of claim 1 wherein the resinous material is processed into closures at a temperature of 370°–400° F.

12. The method of claim 1 wherein the resinous material is a polyolefin.

13. The method of claim 12 wherein the polyolefin is a copolymer of ethylene and vinyl acetate.

14. The method of claim 13 wherein vinyl acetate is present in the copolymer in an amount of between 9 and 25% by weight and the copolymer has a melt index of between 2.0 and 8.0.

15. The method of claim 12 wherein a hardness modifying additive selected from the group consisting of polyethylene and ionically cross-linked ethylene-methacrylic acid copolymers is added to the thermoplastic resinous material.

16. The method of claim 1 wherein the resinous material contains a blowing agent.

17. The method of claim 1 wherein the mold temperature is maintained at a temperature of 70°–90° F.

18. The method of claim 1 wherein the thermoplastic resinous material contains coarse ground powdered pigments.

19. The method of claim 1 wherein the injection pressure is about 16,000 psig.

20. The method of claim 1 wherein the injection of the thermoplastic resinous material into the mold cavity is completed prior to its expansion against the surface of the mold.

21. A method for making a closure made of a thermoplastic resinous material for liquid product containers comprising the steps of:

providing a hot runner injection mold assembly having a plurality of mold cavities, wherein each cavity includes walls defining the shape of said closure and a cavity entrance orifice communicating with each of said cavities, the wall of each mold cavity opposite the entrance orifice being sufficiently spaced from said entrance orifice to permit the formation of a strand of thermoplastic in said cavities, rapidly injecting, at high pressure, an expandable thermoplastic resinous material containing a blowing agent therein in an amount less than that required to fill the mold cavity and in the form of a strand, directly into each of said mold cavities through said entrance orifice, said strands collecting in each of said cavities as randomly-oriented coils, the pressure produced in said mold cavity by said injection temporarily pressurizing said cavity, thereby retarding the expansion of the plastic material sufficiently to allow completion of the injection of said thermoplastic resinous material, while maintaining the integrity of the strand configuration, sealing said entrance orifice immediately after the thermoplastic resinous material has been injected into said cavity to stop any further flow of said resinous material into said cavity and keeping said entrance orifice sealed until said resinous material subsequently expands and solidifies to form said closure;

simultaneously with said temporary pressurization, gradually removing a portion of the air displaced by said injected thermoplastic resinous material through controlled minimum venting of said mold cavity, thereby expanding the coiled resinous material in a controlled manner through a continuation of said minimum venting to fill said mold cavity, the walls of said mold cavity being maintained at a temperature sufficiently cool to cause the resinous material to solidify into a rigid, outer skin when it contacts said walls, whereby the coalesence of said coils during expansion creates randomly-oriented grain lines in the surface of said closure which resembles the appearance of natural cork, and wherein the closure thus formed has a liquid impervious outer skin and a foamed inner core with no appreciable void spaces or separations between said outer skin and said foamed inner core into which said outer skin could collapse when compressed.

22. The method of claim 21 wherein the entrance orifice of each of said mold cavities is sealed by mechanical means.

23. The method of claim 22 wherein the mechanical sealing means comprises valve pins specially designed to fit into the entrance orifice of each mold cavity, said valve pins being actuated by hydraulic or pneumatic means.

24. The product formed by the process of claims 1, 2 or 21.

* * * * *

UNITED STATES PATENT AND TRADEMARK OFFICE
CERTIFICATE OF CORRECTION

PATENT NO. : 4,363,849
DATED : December 14, 1982
INVENTOR(S) : Gary V. Paisley et al It is certified that error appears in the above—identified patent and that said Letters Patent is hereby corrected as shown below:

Please amend the claims as follows:

Claim 1,

Line 10, change "injection" to --injecting--

Signed and Sealed this

Nineteenth Day of April 1983

[SEAL]

Attest:

GERALD J. MOSSINGHOFF

Attesting Officer        Commissioner of Patents and Trademarks